United States Patent [19]
Schwaiger

[11] Patent Number: 6,056,033
[45] Date of Patent: May 2, 2000

[54] APPARATUS FOR THE SIMULTANEOUS WELDING OF AT LEAST FOUR PLASTIC PROFILE SECTIONS CUT

[75] Inventor: Meinhard Schwaiger, Humboldstrasse, Austria

[73] Assignee: Technoplast Kunststofftechnik GmbH, Austria

[21] Appl. No.: 09/099,436

[22] Filed: Jun. 18, 1998

[30] Foreign Application Priority Data

Jun. 18, 1997 [AT] Austria ................................ GM 372/97

[51] Int. Cl.⁷ .................................................. B29C 65/20
[52] U.S. Cl. ................... 156/499; 156/304.2; 156/304.6; 156/507; 156/557; 156/580
[58] Field of Search ............................... 156/304.1, 304.2, 156/304.6, 499, 507, 557, 580, 583.1

[56] References Cited

U.S. PATENT DOCUMENTS

| | | | |
|---|---|---|---|
| 4,963,219 | 10/1990 | Nichols et al. | 156/304.2 |
| 4,971,639 | 11/1990 | Quinn et al. | 156/64 |
| 4,995,935 | 2/1991 | Ganzberger | 156/499 |
| 5,439,546 | 8/1995 | Brichenstein | 156/304.2 |
| 5,736,000 | 4/1998 | Sturtz | 156/499 |
| 5,855,720 | 1/1999 | Johnson et al. | 156/272.2 |
| 5,902,447 | 5/1999 | Johnson et al. | 156/499 |
| 5,902,657 | 5/1999 | Hanson et al. | 428/36.92 |

FOREIGN PATENT DOCUMENTS

| | | |
|---|---|---|
| 393 809 | 12/1991 | Austria . |
| 341 235 | 3/1993 | European Pat. Off. . |
| 4024634 | 2/1992 | Germany . |

*Primary Examiner*—James Sells
*Attorney, Agent, or Firm*—Watson Cole Grindle Watson, P.L.L.C.

[57] ABSTRACT

The invention relates to an apparatus for the simultaneous welding of at least four plastic profile sections cut for mitre joint for window or door leaves or frames with four welding heads which are arranged moveable relative towards one another, with stops being provided in the zone of each welding head in order to outwardly support the ends of the profile sections and with spacer elements being provided which support the surfaces of the profile sections cut for mitre joint. A precise arrangement of the corners is achieved in such a way that the spacer elements are outfitted with springs.

4 Claims, 1 Drawing Sheet

APPARATUS FOR THE SIMULTANEOUS WELDING OF AT LEAST FOUR PLASTIC PROFILE SECTIONS CUT

FIELD OF INVENTION

The present invention relates to an apparatus for the simultaneous welding of at least four plastic profile sections cut for mitre joint for window or door leaves or frames with four welding heads which are arranged moveable relative towards one another, with stops being provided in the zone of each welding head in order to outwardly support the ends of the profile sections and with spacer elements being provided which support the surfaces of the profile sections cut for mitre joint.

So-called four-head welding machines are known for the production of window frames or leaves made of PVC profiles. In these welding machines four welding heads are arranged horizontally or nearly perpendicularly in order to perform the required welding processes at the edges of the respective frame. In order to be able to produce the different sizes of window leaves, said welding heads are displaceable with respect to one another. Such a four-head welding machine is known from AT-B 393 809. Moreover, from U.S. Pat. No. 4,995,935 a welding machine is known in which the inserted profile sections are held on their outer sides by stops and in which spacer elements are provided in order to temporarily hold the inserted profile sections. As a result of the stops and the spacer elements a template is formed for each profile section in which the same can be inserted with precise fit. The insertion can be made manually or by a respective industrial robot.

The problematic aspect in known welding machines is, however, that the length of the profile sections is subject to a certain tolerance. The welding heads and thus the position of the stops and the spacer elements is set to the nominal size of the profile sections. If a profile section is now inserted whose length is larger than the nominal size, parts must be deformed in order to enable the insertion at all. For example, the profile section can bend through outwardly. An undesirable displacement of the spacer elements can also occur. If conversely the profile section is smaller than the nominal size, it will no longer be held in a well-defined position by the stops and the spacer elements. Instead, it can be arranged so as to lie obliquely or away from the stops. In this way it is no longer ensured that the ends of the profile section cut for mitre joint are moved during the welding in a positionally precisely defined manner. An offset of the corners will occur which represents not only an aesthetic impairment, but also has an adverse effect on the proper function of such a window or such a door.

PRIOR ART

From DE 40 24 634 A a welding machine is known in which the welding heads are movable transversally to the direction of the welding seam. In this way a shrinking process by the welding can be compensated up to a certain amount. The above problems, however, are not solved.

Moreover, EP 0 341 235 A shows a welding machine with which several frames can be welded simultaneously. This specification, however, does not show any solution to the problems as are described above.

SUMMARY OF THE INVENTION

It is the object of the present invention to avoid these disadvantages and to further develop the apparatus described above in such a way that even when there are certain fluctuations in the length of the profile section, leaves and frames with precise dimensions and precise corner arrangements can be produced.

This object is achieved in accordance with the invention in such a way that the spacer elements are equipped with springs. The relevant aspect in the present invention is that independent from certain fluctuations in the length of the profile sections a well-defined position of the profile sections is achieved during insertion. The occurring forces are not to be so high during this that undesirable deformations occur. A secure close fit on the stops can be achieved by the springs. After the insertion of all four profile sections they are tightly clamped by respective clamping apparatus in the known manner, whereupon the spacer elements can be pulled out. Subsequently, a welding reflector is introduced in the remaining gap and the profile ends are melted and, after the welding reflector is pulled out, welded together. The length tolerances of the profile sections are compensated by a different melting depth during the welding process. This means that in the case of profile sections with minimal dimensions only a minimal melting depth will be realised. In contrast to this, profile sections with a length beyond the nominal length are melted more strongly.

It is preferably provided that the spacer elements consist of a precisely guided carrier on which diaphragms are arranged. In this way it is possible to achieve that the tolerance ranges of the individual profile sections are substantially independent from one another and that the function of the apparatus in accordance with the invention is not impaired. It is possible, for example, that the perpendicular profile sections are provided within the tolerance range with a maximum length, whereas the horizontal profile sections are of minimal length. In this case the one diaphragms deflect very strongly in order to be able to receive the large profile sections. The other diaphragms deflect only minimally, namely to merely such an extent that the profile sections are held securely.

The invention is now explained below in closer detail by reference to the embodiment shown in the figures, wherein:

DESCRIPTION OF THE PREFERRED EMBODYMENTS OF THE INVENTION

Figure 1:
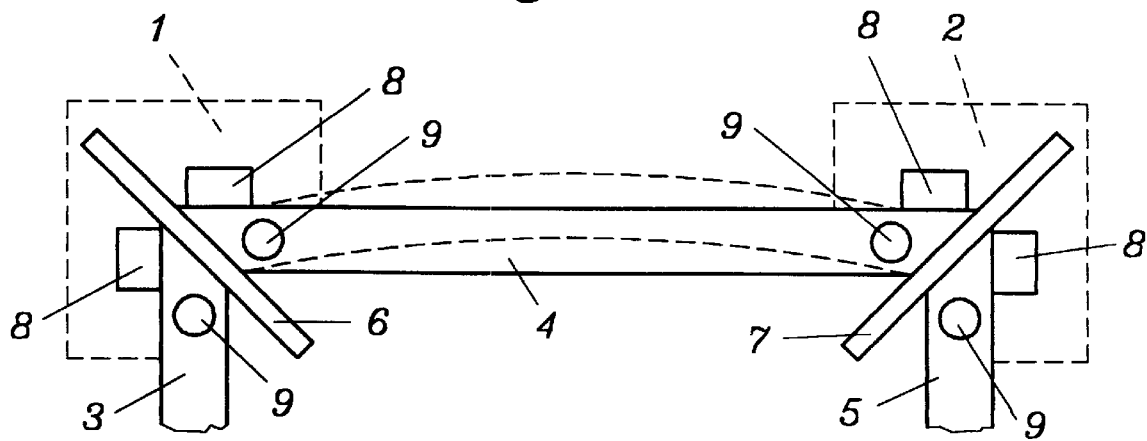
FIG. 1 schematically shows a partial top view of a profile welding apparatus pursuant to the state of the art.

FIG. 1 indicates the two upper welding heads 1 and 2 of a four-head welding machine. Profile sections 3, 4 and 5 are inserted into the welding machine. The profile sections 3, 4 and 5 are cut at their ends with a mitre angle of 45° in order to be joined into a window frame or window leaf. The profile sections 3, 4 and 5 are held by spacer elements 6 and 7 which are arranged in such a way that the cutting surfaces of the mitre joint rest on the same. Moreover, stops 8 are provided in the end zones of the profile on the outer side which determine a clearly determined position of the profiles 3, 4 and 5. Clamping apparatuses are designated with reference numeral 9 which hold the profile once the spacer elements 6, 7 have been pulled out.

If the profile section 4 is longer than the nominal size, the profile section will try to yield laterally, which is particularly critical in the case of relatively long and thin profiles. Window frames or leaves produced in this way are warped and depart in their dimensions from the required sizes. FIG. 1 shows such a situation in an exaggerated way with the broken lines.

Figure 2:
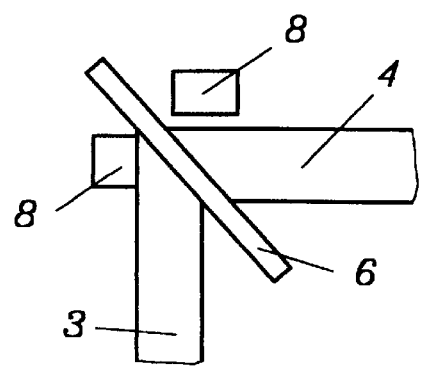
FIG. 2 shows a detail of FIG. 1.

FIG. 2 shows a situation where the profile section 4 is shorter than the nominal length. As a result of manufacturing, the length of the profile section can deviate from the desired length by approx. 1 mm. In the case of the shortened profile section 4 a clearly defined position is no longer defined. In the area of the welding head it is possible that a situation arises as is shown in FIG. 2.

Figure 3:
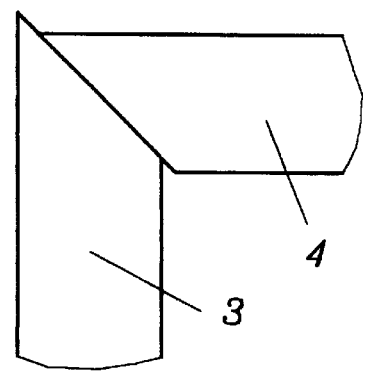
FIG. 3 shows a corner joint produced with an apparatus according to the state of the art and FIG. 4 shows a detail according to FIG. 2 of an apparatus in accordance with the invention.

If the clamping jaws 9 close in this position a corner arrangement is achieved as is shown in FIG. 3 on an enlarged scale. Such a corner arrangement is not only unsatisfactory from an aesthetic viewpoint, it also leads to problems in a functional respect.

Figure 4:
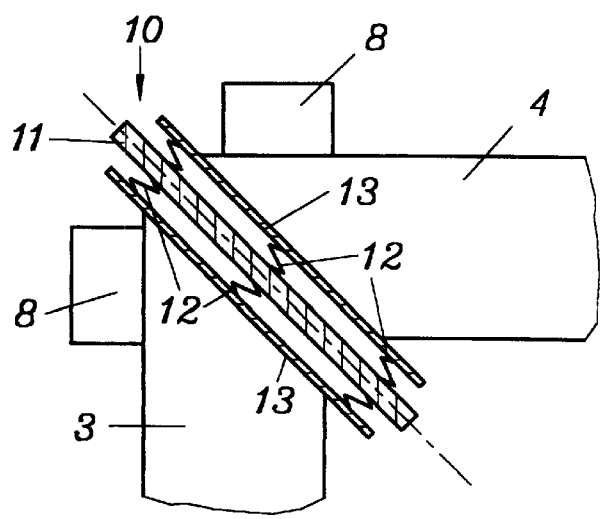

FIG. 4 shows the solution in accordance with the invention in a schematic manner. The spacer element 10 consists of a carrier 11 on which diaphragms 13 are attached by way of springs 12. The stops 8 are arranged in the known manner. The travel of the springs 12 is dimensioned in such a way that in the case of a profile section with minimal dimensions, i.e. with a profile section in which the tolerance range in the direction of small length is used up completely, a still sufficient pressing force is made available in order to allow a secure close fit on stop 8. On the other hand, the springs 12 are arranged in such a way that even in the presence of a profile section 4 with maximum length there will not be any impermissible deformation of the profile section 4 or any other components. Carrier 11 is rigid during the insertion of the profile sections 3, 4, i.e. it cannot be pressed from its set position even by different forces which may be present on both of its sides. After the closure of the clamping jaws, which are not shown in FIG. 4, the spacer element 10 in accordance with the invention is pulled out in the known manner from the gap between the profile sections 3, 4 and instead a welding reflector, which is also not shown, is introduced for heating the profiles so as to enable the welding.

The invention allows the production of accurately dimensioned window leaves or frames and door leaves or frames from PVC profiles or the like even in cases where profile sections, which is assumed in this case, are subject to certain tolerances in length.

I claim:

1. An apparatus for the simultaneous welding of at least four plastic profile sections cut for mitre joint for window or door leaves or frames with four welding heads which are arranged moveable relative towards one another, with stops being provided in the zone of each welding head in order to outwardly support the ends of the profile sections and with spacer elements being provided which support the surfaces of the profile sections cut for mitre joint, characterized in that the spacer elements are outfitted with springs.

2. An apparatus as claimed in claim 1, characterized in that the spacer elements consist of a precisely guided carrier on which diaphragms are arranged on both of its side.

3. An apparatus as claimed in claim 1, characterized in that the springs are arranged in such a way that in the case of minimal dimensioning of the profile section a sufficient holding force is ensured between the stop and the spacer element and that in the case of maximum dimensioning of the profile section an undesirable deformation of components is prevented.

4. An apparatus as claimed in claim 2, characterized in that the springs are arranged in such a way that in the case of minimal dimensioning of the profile section a sufficient holding force is ensured between the stop and the spacer element and that in the case of maximum dimensioning of the profile section an undesirable deformation of components is prevented.

* * * * *